United States Patent
Bubat et al.

(10) Patent No.: US 8,658,279 B2
(45) Date of Patent: Feb. 25, 2014

(54) POROUS, FREE-FLOWING HYDROPHOBIC PARTICLES LOADED WITH AQUEOUS FLUID WITH COMPATIBILIZER ADDITIVE

(75) Inventors: Alfred Bubat, Wesel (DE); Frank Albert, Xanten (DE); Jürgen Hartmann, Oberhausen (DE); Jörg Garlinsky, Wesel (DE)

(73) Assignee: BYK-CHEMIE, Wesel (DE)

( * ) Notice: Subject to any disclaimer, the term of this patent is extended or adjusted under 35 U.S.C. 154(b) by 1008 days.

(21) Appl. No.: 12/723,752

(22) Filed: Mar. 15, 2010

(65) Prior Publication Data

US 2010/0206761 A1 Aug. 19, 2010

Related U.S. Application Data

(63) Continuation of application No. PCT/EP2008/008713, filed on Oct. 15, 2008.

(30) Foreign Application Priority Data

Oct. 17, 2007 (DE) .......... 10 2007 050 046

(51) Int. Cl.
*B32B 9/04* (2006.01)

(52) U.S. Cl.
USPC .......... 428/402; 210/263; 210/291; 504/367; 106/900

(58) Field of Classification Search
USPC .......... 428/402; 210/291, 263; 106/900; 504/367
See application file for complete search history.

(56) References Cited

U.S. PATENT DOCUMENTS

| | | | |
|---|---|---|---|
| 3,299,112 A | | 1/1967 | Bailey |
| 4,525,279 A * | | 6/1985 | Cooper .......... 210/728 |
| 4,933,002 A | | 6/1990 | Petroff et al. |
| 5,352,390 A * | | 10/1994 | Hilton et al. .......... 252/601 |
| 5,496,865 A | | 3/1996 | Heese et al. |
| 5,676,660 A | | 10/1997 | Mukaida et al. |
| 6,039,965 A * | | 3/2000 | Donlan et al. .......... 424/405 |
| 6,177,183 B1 | | 1/2001 | Hekal |
| 6,620,516 B1 | | 9/2003 | Kurihara |
| 2002/0011584 A1 * | | 1/2002 | Uchiyama et al. .......... 252/8.91 |
| 2007/0042183 A1 * | | 2/2007 | Stenzel et al. .......... 428/402.2 |
| 2007/0084775 A1 * | | 4/2007 | Klipper et al. .......... 210/263 |
| 2009/0023584 A1 | | 1/2009 | Abe |
| 2012/0214857 A1 * | | 8/2012 | Reinhard et al. .......... 514/407 |

FOREIGN PATENT DOCUMENTS

| | | |
|---|---|---|
| CH | 6 85 878 A5 | 10/1995 |
| CN | 1753952 A | 3/2006 |
| CN | 1 816 589 A | 8/2006 |
| DE | 40 11 942 A1 | 10/1990 |
| DE | 196 04 601 A1 | 8/1996 |
| DE | 10 2006 031 152 A1 | 1/2008 |
| EP | 04 59 208 A2 | 12/1991 |
| EP | 1 258 290 A2 | 11/2002 |
| JP | 61-236856 A | 10/1986 |
| JP | 091 3699 A | 1/1997 |
| JP | 2006-283035 A | 10/2006 |
| WO | 01/12726 A1 | 2/2001 |
| WO | 2005/003215 A1 | 1/2005 |
| WO | 2007/083664 A1 | 7/2007 |
| WO | 2004/074379 A1 | 9/2009 |

* cited by examiner

*Primary Examiner* — Margaret Moore

(74) *Attorney, Agent, or Firm* — Norris McLaughlin & Marcus PA

(57) ABSTRACT

Storage tank loaded with an aqueous medium and made of porous, freely flowing particles, wherein the particles are formed from a hydrophobic polymer and the loading of said particles contains at least one particular mediator additive of the general formula (I), the use of which as an entrainer delivery agent for removing volatile components from plastics, for evenly doping intermediate plastic products and/or plastic articles with adjuvants as a soil improvement agent such as a delivery agent for a pest management agent or fertilizer

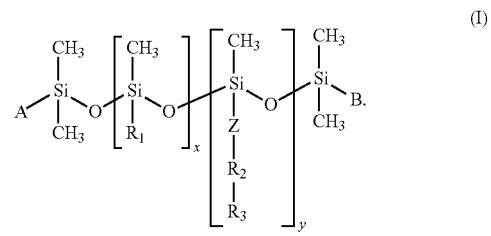

(I)

19 Claims, No Drawings

POROUS, FREE-FLOWING HYDROPHOBIC PARTICLES LOADED WITH AQUEOUS FLUID WITH COMPATIBILIZER ADDITIVE

This application is a continuation of PCT/EP2008/008713 filed 15 Oct. 2008 (international filing date).

The present invention relates to a reservoir charged with an aqueous fluid and composed of porous, free-flowing particles, where the particles have been formed from a preferably hydrophobic polymer and the charge comprises at least one compatibilizer additive of the general formula (I) below, and to the use of the charged reservoir to deliver an entraining agent for removal of volatile components from plastics, in particular auxiliaries that generate odor, or for the uniform addition of plastics auxiliaries, or as water reservoir, or as soil improver.

BACKGROUND OF THE INVENTION

It is well known that aqueous fluids, in particular water, can be used as entraining agents in order, inter alia, to achieve a reduction in residual monomer contents when polymers are processed. This method can also achieve a reduction in the emission of volatile organic substances that may emit odors; this is a necessity when recycled polymers are processed.

In order to achieve maximum efficiency in introducing water into a polymer which is to be treated, porous particles charged with water can be incorporated into the polymer melt during the thermoplastic processing of the polymer. Water is driven off during the extrusion process and acts as entraining agent for volatile substances, and these are removed with the water vapor.

The porous particles used here are preferably made of hydrophobic polymers, for example polyethylenes or polypropylenes. A feature of these, inter alia, is high chemical stability and high mechanical and thermal stability. These polymers are therefore also suitable for the production of porous particles which can be charged with aqueous fluids and passed onward for further use.

WO 2005/003215 discloses porous, at least to some extent open-pored, particles respectively corresponding reservoirs charged with aqueous fluids. However a disadvantage of particles or reservoirs of this type is that the particles have to be equipped with a relatively large amount of surfactant before they are charged with water. That is the only way of achieving a charging level of more than 50% using an aqueous fluid. However, the charging of particles with relatively large amounts of surfactants is problematic because these surfactants can exert a not inconsiderable effect on the desired use of the charge. When the charged reservoirs are used to deliver entraining agent, one possibility inter alia is that the surfactants form degradation products which firstly consume entraining agent, i.e. water, and secondly also can themselves be odor-generating substances.

It was therefore an object of the present invention to provide a reservoir which has a high level of charge of aqueous fluids, whereby the entire charge of the reservoir is available without impairment, i.e. in essence entirely, for the desired use.

SUMMARY OF THE INVENTION

This object is achieved via the reservoir of the invention, charged with an aqueous fluid and composed of porous, free-flowing particles, where the particles of the reservoir have been formed from a preferably hydrophobic polymer, and the average size of the particles is preferably from 50 to 5000 µm, and the particles preferably have at least to some extent open-pore structure, and the average pore diameter of the particles is preferably from 1 µm to 200 µm, and the aqueous charge of the reservoir comprises at least one compatibilizer additive of the general formula (I)

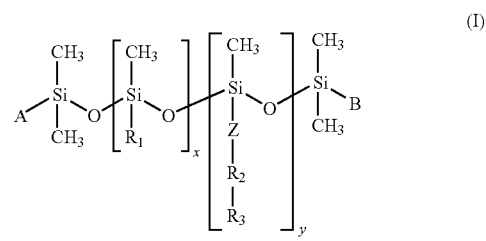

in which
R$_1$ is an alkyl moiety having from 1 to 6 carbon atoms,
A and B, identical or different, are an alkyl moiety having from 1 to 6 carbon atoms or a group of the formula —Z—R$_2$—R$_3$, in which
Z is a moiety of the formula —C$_r$H$_{2r}$—O—, in which
r is a whole number from 1 to 10, preferably from 1 to 4, particularly preferably 3,
R$_2$ is a moiety of the formula —(C$_2$H$_4$O—)$_n$(C$_3$H$_6$O—)$_m$, in which
m is 0 or a whole number from 1 to 4,
n is a whole number from 1 to 12,
and the arrangement of the units that are repeated n times and, respectively, m times can be of block type or random,
R$_3$ is an OH group or an alkyl moiety having from 1 to 6 carbon atoms, preferably a methyl moiety
x is 0 or a whole number from 1 to 3, and
y is 0 or a whole number from 1 to 3,
where the compatibilizer additive must always have at least one group of the formula —Z—R$_2$—R$_3$.

DETAILED DESCRIPTION

The compatibilizer additives used preferably comprise compounds of the general formula (I) in which the average molecular weight of the moiety of the formula —(C$_2$H$_4$O—)$_n$(C$_3$H$_6$O—)$_n$ is from 100 to 5000, preferably from 150 to 1000, and particularly preferably from 200 to 600.

Equal preference is given to use, as compatibilizer additives, of compounds of the formula I in which
R$_1$ is a moiety selected from the group consisting of methyl, ethyl, propyl, isopropyl, and n-propyl and
n, m, x, y, r, A, B, Z, R$_2$, and R$_3$ are defined as mentioned above.

Other preferred compatibilizer additives are those in which
A is a methyl moiety or a group of the formula —Z—R$_2$—R$_3$,
B is a methyl moiety,
R$_2$ is a moiety of the formula 13 (C$_2$H$_4$O—)$_n$ or —(C$_2$H$_4$O—)$_n$(C$_3$H$_6$O—)$_m$, where
m is 1 or 2,
n is 5, 6, 7, 8, or 9, and x, y, r, Z, and R$_3$ are defined as mentioned above.

All of the compatibilizer additives listed for preferred use must respectively comprise at least one group of the formula —Z—R$_2$—R$_3$.

The production of the compatibilizer additives listed above is known to the person skilled in the art. Reference is made to U.S. Pat. No. 3,299,112 or U.S. Pat. No. 4,933,002 for corresponding disclosure.

The porous, preferably hydrophobic particles that are used in the invention for the production of the charged reservoir and that have at least to some extent open-pore structure have a sponge-like, cellular microstructure, or else a network-like microstructure. The pores are at least to some extent open pores, and, at least in some regions of the structure of the particles, there is connection between the pores and channels present in the particle.

The particles used in the invention are preferably composed of hydrophobic polymers, such as thermoplastics and/or elastomers. It is particularly preferable that the particles used in the invention are composed of polymers or mixtures of polymers selected from the group consisting of polyolefins, in particular polyethylenes or polypropylenes, fluoropolymers, polycarbonates, polystyrenes, polyesters, polyvinyl chlorides, polyurethanes, polymethacrylate, and polyamides.

It is particularly preferable that the particles used in the invention are composed of at least one polymer or copolymer selected from the group consisting of HDPE (high-density polyethylene), LDPE (low-density polyethylene), LLDPE (linear low-density polyethylene), UHMW PE (ultrahigh-molecular-weight polyethylene), mPE (metallocene PE), polypropylene, ethylene-propylene copolymer, polyisobutene, PB (polybutylene), PMP (polymethylpentene), PTFE (polytetrafluoroethylene), FEP (perfluoroethylene-propylene copolymer), CTFE (polychlorotrifluoroethylene), ECTFE (ethylene-chloro-trifluoroethylene copolymer), ETFE (ethylene-tetrafluoroethylene copolymer, tetrafluoro-ethylene-propylene copolymer, polyvinylidene fluoride, polyvinyl chloride, copolymer of tetrafluoroethylene and hexafluoro-propylene, copolymer of tetrafluoroethylene and perfluoroalkyl vinyl ether, copolymer of ethylene-tetrafluoroethylene, PC (polycarbonate), polystyrene, styrene-acrylonitrile copolymer, styrene-butadiene copolymer, acrylonitrile-butadiene-styrene copolymers, PBT (polybutylene terephthalate), PET (polyethylene terephthalate), and PA (polyamides), such as PA6.

The porosity of the particles used in the invention is preferably at least 30% by volume, more preferably at least 50% by volume, particularly preferably at least 60% by volume. The porosity of the particles used in the invention is particularly preferably from 50 to 80% by volume. Porosity (by volume) is measured by methods well known to the person skilled in the art. By way of example, the porosity of the particles used in the invention can be determined by a pycnometric test method using water as non-wetting liquid, or by means of suitable intrusion methods, e.g. by mercury intrusion.

The average size of the particles used in the invention is preferably from 10 to 10 000 μm, more preferably from 200 to 7000 μm, still more preferably from 500 to 5000 μm, most preferably from 1000 to 4000 μm, and in particular from 1500 to 3000 μm. The average particle size is preferably determined microscopically by using a representative specimen amount and micrometer lens system or preferably a suitable image evaluation method. Measurement methods of this type are known to the person skilled in the art.

In one preferred embodiment of the invention, the average pore diameter of the particles used in the invention is preferably from 0.5 to 500 μm, more preferably from 1 to 400 μm, still more preferably from 1 to 300 μm, most preferably from 1 to 200 μm, and in particular from 1 to 100 μm, and this average pore diameter can be determined by well known measurement methods. By way of example, the average pore size is determined on the basis of digitalized scanning electron micrographs of images of fractured surfaces of the specimens, these being evaluated with the aid of suitable image analysis software. The pore diameter of about 50 to 100 pores is measured here in μm from a scanning electron micrograph. The relevant average pore diameter is calculated as the average of the individual values.

The particles listed above and used in the invention are available commercially.

Surprisingly, it has been found that the aqueous fluid, in particular water, has to comprise only small amounts of a compatibilizer additive of the general formula I in order to ensure up to at least 30% by weight charging of the reservoir with aqueous fluids, based on the total weight of the charged reservoir.

In order to achieve a water-charging level of preferably ≥30% by weight, based on the total weight of the charged reservoir, using an aqueous fluid, it is therefore sufficient that an amount of preferably at most 4% by weight, more preferably at most 3% by weight, still more preferably at most 1% by weight, most preferably at most 0.5% by weight, and in particular at most 0.1% by weight, based in each case on the total weight of the aqueous fluid, of at least one compatibilizer additive of the formula I is present in suspension or solution in the aqueous fluid provided for the charge.

The achievable level of charging of the particles used in the invention with aqueous fluids, in particular with water, is preferably up to at least 30% by weight, more preferably up to at least 50% by weight, and particularly preferably up to at least 60% by weight, based in each case on the total weight of the charged reservoir.

For this type of charging it is particularly advantageous that an amount of from 0.01 to 5% by weight, more preferably from 0.03 to 3% by weight, still more preferably from 0.05 to 2% by weight, most preferably from 0.05 to 1% by weight, based in each case on the total weight of the charged reservoir, of at least one compatibilizer additive of the formula I is present in the charge in the reservoir.

The charging of the particles used in the invention with the aqueous fluid takes place in the invention by bringing the particles into contact with a compatibilizer additive of the formula I, if appropriate with shaking and/or stirring, for a period of preferably at least 10 min, more preferably at least min, still more preferably at least 60 min, most preferably at least 70 min, and in particular at least 90 min.

In order to accelerate the wetting procedure, it is also possible to use ultrasound and/or to apply a vacuum. It is particularly preferable that the particles used in the invention are brought into contact with the aqueous fluid which by this stage comprises the compatibilizer additive of the formula I.

The compatibilizer additive is present here in disperse form, preferably dissolved or suspended form, in the aqueous fluid.

It is particularly preferable that the wetting and charging of the particles used in the invention takes place in one step, preferably under vacuum. Less time is therefore needed for complicated wetting procedures, and there is therefore a time saving and cost saving.

The aqueous fluid used for the charge is preferably water.

The present invention also provides the use of a charged reservoir described above as water reservoir.

The present invention also provides the use of a charged reservoir described above to deliver entraining agent for removal of volatile constituents, such as volatile organic compounds, and/or odor-emitting substances from plastics, and in particular to deliver entraining agent for removal of undesired volatile and, where appropriate, odor-generating compounds from plastics, for example recyclates, and thus to reduce emission of said contaminants from plastics items produced from the recyclates, or for uniform doping of plastics intermediates and/or plastics items with auxiliaries.

For this type of addition of auxiliaries within plastics, the aqueous fluid charged can comprise, alongside the compatibilizer additive used in the invention, auxiliaries selected from the group consisting of antifogging agents, antioxidants, flame retardants, lubricants, light stabilizers, heat stabilizers, and other stabilizers, UV filters, mold-release agents, antistatic agents, foaming agents, impact modifiers, dyes, fillers, optical brighteners, and rheology additives.

The invention also provides the use of a reservoir charged with aqueous fluid, the charge of which comprises, as a function of the use, a fertilizer, a plant-protection agent, or an insecticide, and/or growth-promoting agent, or for soil improvement, for irrigation, for fertilization, and/or for plant protection.

The invention further provides the use of a reservoir of the invention, preferably charged with water, for humidification and/or air-conditioning.

For all intended uses of the reservoir of the invention charged with aqueous fluid, preferably water, it is advantageous that the charge comprises a biocide to counter colonization by microbes during the storage of the charged reservoir.

The invention further provides a process for the treatment of recycled plastics with a charged reservoir of the invention to deliver entraining agent, in order, during the processing thereof, to prevent or to reduce the emission of volatile organic compounds and/or of odor-emitting substances from the items produced from the recycled plastics.

The examples below serve for further explanation of the invention but do not limit the same.

EXAMPLES

Compatibilizer Additives

The compounds of the general formula (I) listed in table 1 below were used as compatibilizer additives

TABLE 1

| Structural elements | CA 1 | CA 2 | CA 3 | CA 4 | CA 5 |
|---|---|---|---|---|---|
| A | —$CH_3$ | —Z—$R_2$—$R_3$ | —$CH_3$ | —$CH_3$ | —$CH_3$ |
| B | —$CH_3$ | —$CH_3$ | —$CH_3$ | —$CH_3$ | —$CH_3$ |
| $R_1$ | — | —$CH_3$ | —$CH_3$ | —$CH_3$ | —$CH_3$ |
| $R_2$ | —$(C_2H_4O—)_n$ | —$(C_2H_4O—)_n$ | —$(C_2H_4O—)_n$ —$(C_3H_6O—)_m$ | —$(C_2H_4O—)_n$ | —$(C_2H_4O—)_n$ |
| $R_3$ | —OH | —$CH_3$ | —OH | —OH | —OH |
| x | 0 | 2 | 1 | 1 | 1 |
| y | 1 | 0 | 1 | 1 | 2 |
| n | 6 | 7 | 7 | 8 | 5 |
| m | 0 | 0 | 1 | 0 | 0 |
| Z | —$C_3H_6$—O— | —$C_3H_6$—O— | —$C_3H_6$—O— | —$C_3H_6$—O— | —$C_3H_6$—O— |

Example 1

700 g of porous polypropylene (PP) particles of average size 3 mm×3 mm, with porosity of 70% by volume, and with average pore size of from 20 to 80 μm were charged with 1300 g of a 0.08% strength by weight aqueous solution of CA 1 (in table 1), by using a tumbler mixer (=0.1% by weight of compatibilizer additive, based on the total weight of the uncharged particles; =0.06% by weight of compatibilizer additive, based on the total weight of the charged reservoir). The charging time was 90 minutes and this gave 65% by weight water absorption, based on the total weight of the charged reservoir.

Examples 2-7

According to example 1 (0.08% strength by weight aqueous solution) further porous particles listed in table 2 were charged. In each case, the water charge here (stated in % by weight) is based on the total weight of the charged reservoir of the invention.

TABLE 2

| Ex. | Particles | Porosity [% by vol.] | Particle size | Compatibilizer additive | Water charge [% by wt.]* |
|---|---|---|---|---|---|
| 2 | HDPE | 60 | 3 mm × 3 mm | CA 1 | 50 |
| 3 | PC | 70 | 1 mm × 1 mm | CA 2 | 60 |
| 4 | PA6 | 65 | 3 mm × 3 mm | CA 4 | 55 |
| 5 | PS | 60 | 4 mm × 4 mm | CA 2 | 50 |
| 6 | PET | 50 | 3 mm × 3 mm | CA 3 | 40 |
| 7 | PP | 70 | <1500 μm | CA 5 | 65 |

HDPE: high-density-polyethylene, PC: polycarbonate, PA6: nylon-6, PS: polystyrene, PET: polyethylene terephthalate, PP: polypropylene
*based on the total weight of the charged reservoir Determination of Charge Level and Charging Time for the Porous Particles:

A precondition for determining the charge level and the characteristic charging time is that the porosity by volume of the material to be investigated is known. About 10 to 30 g of the material to be investigated are weighed into a 500 ml glass flask. The amount of water added to the particles, i.e. the volume of water to be added, is determined from the porosity of the particles or, respectively, from the pore volume of the amount of particles weighed into the flask. The pore volume of the particles can be determined here from the amount weighed into the flask, the density p of the polymer and the porosity ϵ. In the first step, the amount of water metered onto the material is such that complete absorption of the water by the particles can be expected. To this end, the volume of water added corresponds to about 60% of the pore volume determined for the particles.

After addition of the water, the glass flask containing the particles is connected to suitable mixing equipment, e.g. a rotary evaporator using a water bath controlled to 25° C. Mixing is then continued until the particles are externally dry and have good flowability. A stopwatch is used to determine the charging time from the start of the mixing process up to complete absorption of the water.

The glass flask is then removed from the mixing equipment and a further amount of water is added corresponding to 5% of the pore volume. Mixing is then repeated and again the stopwatch is used to determine the time in turn required for complete absorption of this amount of water by the particles.

This procedure is repeated until the particles have become saturated with water, the amount of water metered onto the material each time corresponding to 5% of the pore volume. Saturation is defined here as the condition in which, even after a total charging period of 3 hours, there is still some water perceptible on the wall of the glass flask and/or some perceptible caking of the particles. The time taken as characteristic charging time here is the total of the charging times determined by the stopwatch, for each of the periods where the amount of water was completely absorbed by the particles. The saturated particles are then again weighed, and the total amount of water absorbed by the particles is determined by taking the difference from the initial weight. The charge level of the particles is obtained from the ratio of the total amount of water absorbed by the particles to the weight of the unsaturated particles, in percent (by weight).

Example 8

Sensory Testing of PP Recyclate

A polypropylene recyclate was devolatilized in an extruder at 200° C. with, for delivery of entraining agent, respectively 0.5% by weight, 1% by weight, 1.5% by weight, 2% by weight, 2.5% by weight, or 3% by weight, based on the total weight, of a reservoir produced as in example 1, equipped with an aqueous charge comprising CA 1 as compatibilizer additive, and was processed to give pellets. Specimens of the respective devolatilized pellets were tested for their odor characteristics after storage in accordance with VDA 270 "Bestimmung des Geruchsverhaltens von Werkstoffen der Kraftfahrzeuginnenausstattung" [Determination of odor characteristics of materials for internal trim of motor vehicles]. The VDA 270 test method is an established method for determining odor emissions from plastics after storage under particular conditions of temperature and humidity by using test personnel to assess odor; the evaluation scale here runs from 1 to 6.

For the test, specimen 0 with no treatment by entraining agent and specimens 1-6 which had been treated with entraining agent were prepared in accordance with variant 3 of VDA 270 and stored at a temperature of 80±2° C. for a period of 2 hours±10 min in a glass container as test vessel, with odorless seal and cover. In order to comply with the storage period of VDA 270 variant 3, the test vessels containing the material were stored in the oven in succession.

For the odor test, each specimen was checked by the three test personnel after storage. Table 3 below gives the test results:

TABLE 3

| Specimen # | Entraining agent treatment | Amount added [% by wt.]* | Sensory assessment |
|---|---|---|---|
| 0 | − | | 4-5 |
| 1 | + | 0.5 | 3-4 |
| 2 | + | 1.0 | 3 |
| 3 | + | 1.5 | 2-3 |
| 4 | + | 2.0 | 2-3 |
| 5 | + | 2.5 | 2-3 |
| 6 | + | 3.0 | 2-3 |

*Amount added of the charged reservoir produced as in example 1 for delivery of entraining agent

What is claimed is:

1. Porous, free-flowing hydrophobic particles formed from a hydrophobic polymer, having a porosity of at least 30% by volume and an open pore structure, loaded with an aqueous fluid, said aqueous fluid comprising at least one compatibilizer additive of the formula (I)

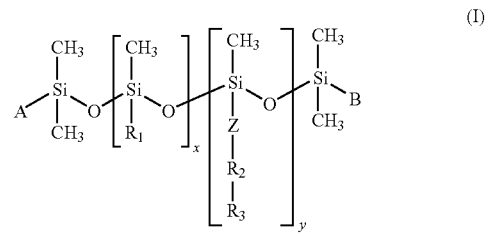

and being useful as an entraining agent for removal of volatile constituents from plastics, or for addition of auxiliaries in plastics, or said aqueous fluid optionally comprising a fertilizer, a plant-protection agent, or an insecticide, and/or growth-promoting agent, and being useful for soil improvement, for irrigation, for fertilization, and/or for plant protection, wherein $R_1$ is an alkyl moiety having from 1 to 6 carbon atoms, A and B, identical or different, are an alkyl moiety having from 1 to 6 carbon atoms or a group of the formula —Z—$R_2$—$R_3$, in which Z is a moiety of the formula —$C_rH_{2r}$—O—, in which r is a whole number from 1 to 10, $R_2$ is a moiety of the formula —($C_2H_4O$—)$_n$($C_3H_6O$—)$_m$, in which m is 0 or a whole number from 1 to 4, n is a whole number from 1 to 12, and the arrangement of the units that are repeated n times and, respectively, m times are of block type or random, $R_3$ is an OH group or an alkyl moiety having from 1 to 6 carbon atoms, x is 0 or a whole number from 1 to 3, and y is 0 or a whole number from 1 to 3, where the compatibilizer additive always has at least one group of the formula —Z—$R_2$—$R_3$.

2. The porous, free-flowing hydrophobic particles of claim 1, wherein $R_1$ is a moiety selected from the group consisting of methyl, ethyl, propyl, isopropyl, and n-propyl.

3. The porous, free-flowing hydrophobic particles of claim 1 wherein

A is a methyl moiety or a group of the formula —Z—$R_2$—$R_3$,

B is a methyl moiety, $R_2$ is a moiety of the formula —($C_2H_4O$—)$_n$ or —($C_2H_4O$—)$_n$($C_3H_6O$—)$_m$, m is 1 or 2, n is 5, 6, 7, 8, or 9.

4. The porous, free-flowing hydrophobic particles of claim 1, wherein the particles are composed of polyolefins, of polycarbonates, of fluoropolymers, of polystyrenes, of polyesters, or of polyamides.

5. The porous, free-flowing hydrophobic particles of claim 1, wherein the porosity of the particles ranges from 50% to 80% by volume.

6. The porous, free-flowing hydrophobic particles of claim 1, wherein the average size of the particles is from 10 to 10 000 μm and the average pore diameter of the particles is from 0.5 to 500 μm.

7. The porous, free-flowing hydrophobic particles of claim 1, wherein the amount of the compatibilizer additive present is from 0.01 to 5% by weight, based on the total weight of the charged reservoir.

8. The porous, free-flowing hydrophobic particles of claim 1, wherein the amount of aqueous fluids in the pores is at least 30% by weight, based on the total weight of the porous hydrophobic particles.

9. The porous, free-flowing hydrophobic particles of claim 1, wherein the aqueous fluid is water.

10. The porous, free-flowing hydrophobic particles of claim 1, wherein the aqueous fluid comprises, based on the total weight of the aqueous fluid, at most 4% by weight of at least one compatibilizer additive.

11. The porous, free-flowing hydrophobic particles of claim 1, wherein the aqueous fluid comprises, based on the total weight of the aqueous fluid, 0.1% by weight of at least one compatibilizer additive.

12. The porous, free-flowing hydrophobic particles of claim 1, wherein the aqueous fluid comprises, in addition to at least one compatibilizer additive, at least one plant-protection agent, insecticide, or fertilizer, and/or other plant growth-promoting agent.

13. The porous, free-flowing hydrophobic particles of claim 1, wherein the aqueous fluid comprises, in addition to the compatibilizer additive, at least one plastics auxiliary.

14. A method for delivering an entraining agent for removal of volatile constituents from plastics; for removal of volatile organic compounds and/or of odor-emitting substances from plastics, and for the uniform addition of plastics auxiliaries which comprises delivering said entraining agent or adding said plastics auxiliaries in the porous particles of claim 11.

15. A method for soil improvement, for irrigation, for fertilization, and/or for plant protection which comprises improving, irrigating, fertilizing or protecting said soil with the porous particles of claim 11.

16. A method for humidification and/or air-conditioning which comprises humidifying or conditioning air with the porous particles of claim 9.

17. A method for reducing or inhibiting the emission of volatile organic compounds and/or of odor-emitting substances from plastics items which are produced from plastics recyclates, which comprises adding the porous particles of claim 1 to said plastics items during the production of said plastics items.

18. The porous particles of claim 1, wherein r is a whole number from 1 to 4.

19. The porous particles of claim 4, wherein said particles are composed of polyethylenes or of polypropylenes.

* * * * *